(12) United States Patent
Johnson

(10) Patent No.: US 7,814,338 B2
(45) Date of Patent: *Oct. 12, 2010

(54) SYSTEM AND METHOD FOR VIRTUAL TAPE MANAGEMENT WITH CREATION AND MANAGEMENT OPTIONS

(76) Inventor: R. Brent Johnson, Limmatquai 50, Zurich (CH) 8001

( * ) Notice: Subject to any disclaimer, the term of this patent is extended or adjusted under 35 U.S.C. 154(b) by 852 days.

This patent is subject to a terminal disclaimer.

(21) Appl. No.: 11/734,643

(22) Filed: Apr. 12, 2007

(65) Prior Publication Data

US 2007/0192556 A1   Aug. 16, 2007

Related U.S. Application Data

(63) Continuation-in-part of application No. 10/457,133, filed on Jun. 9, 2003, now Pat. No. 7,293,179.

(51) Int. Cl.
*G06F 12/00* (2006.01)
*G06F 13/28* (2006.01)
*G06F 13/00* (2006.01)

(52) U.S. Cl. ............. 713/193; 711/164; 711/114; 711/163; 711/153; 711/162; 704/204

(58) Field of Classification Search ............... None
See application file for complete search history.

(56) References Cited

U.S. PATENT DOCUMENTS 6,499,108 B1    12/2002  Johnson
6,578,146 B2    6/2003   Johnson
7,080,260 B2    7/2006   Johnson
7,653,821 B2 *  1/2010   Johnson ............. 713/193
2002/0035664 A1* 3/2002  Yates et al. .......... 711/111
2003/0033495 A1* 2/2003  Lawman et al. ....... 711/163

* cited by examiner

*Primary Examiner*—Nasser Moazzami
*Assistant Examiner*—Fikremariam Yalew
(74) *Attorney, Agent, or Firm*—Head, Johnson & Kachigian, P.C.

(57) ABSTRACT

Remote configuration and utilization of a virtual tape management system with creation and management options. At least one security administrator CPU is communicably attached to a virtual tape management CPU. A pair of disk drives is communicably attached to the virtual tape management CPU and to the security administrator. First software within the virtual tape management CPU validates authorized remote access to said disk drives and encrypts the data. Second software facilitates remote configuration and utilization of the virtual tape management CPU. Third software provides tape image file processing including inspecting each remote data storage to determine if a file is present, opening the file, reading tape related information thereon, and reading from or writing to the disk arrays. Fourth software provides checker support for tape image files for enumerating tape image files on the disk drives, opening the tape image files, and reading the tape related information.

8 Claims, 4 Drawing Sheets

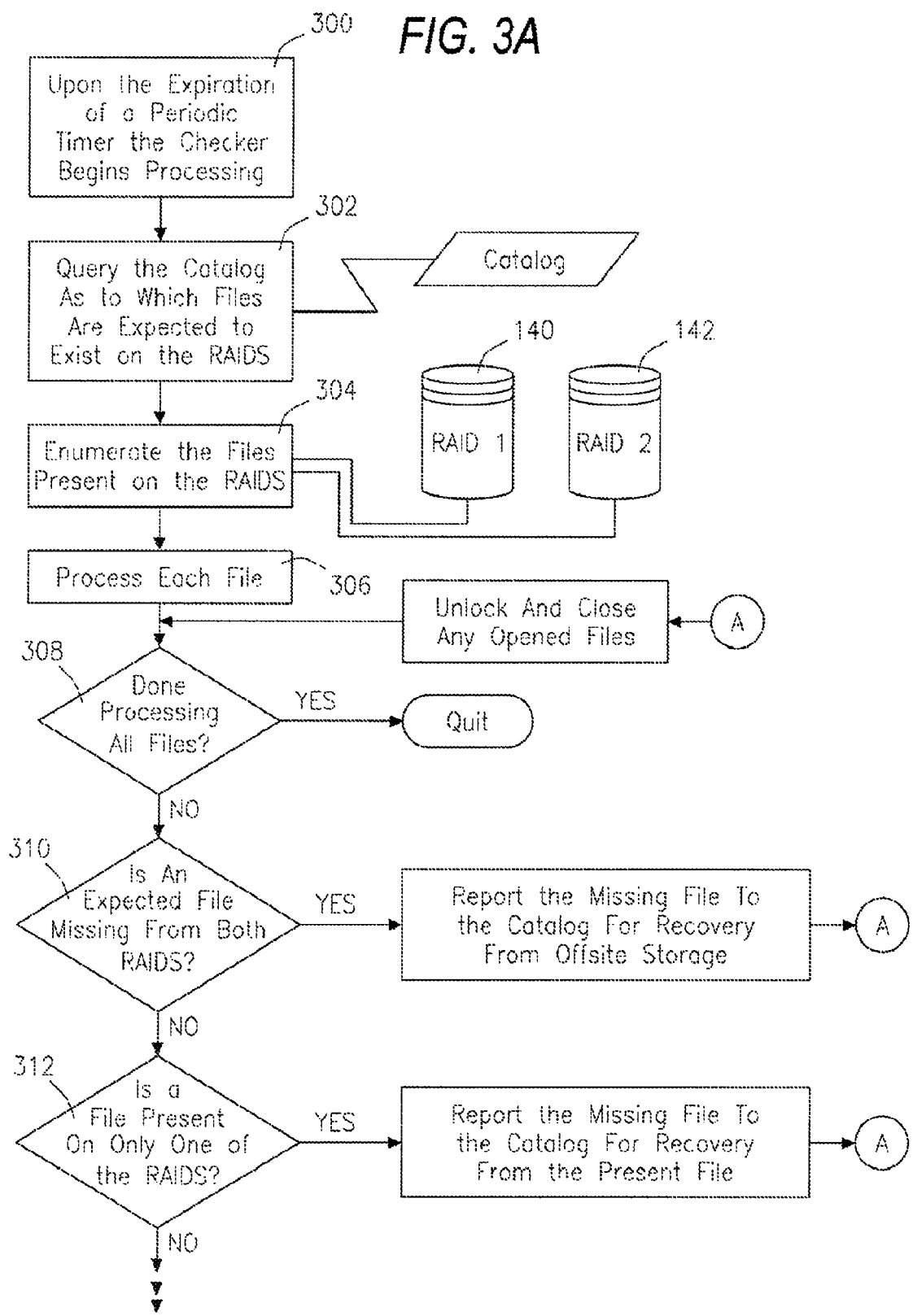

SYSTEM AND METHOD FOR VIRTUAL TAPE MANAGEMENT WITH CREATION AND MANAGEMENT OPTIONS

REFERENCE TO PENDING APPLICATION

This application is a continuation-in-part of U.S. patent application Ser. No. 10/457,133, filed Jun. 9, 2003, entitled "System and Method For Virtual Tape Management With Remote Archival and Retrieval Via An Encrypted Communication Protocol."

REFERENCE TO MICROFICHE APPENDIX

This application is not referenced in any microfiche appendix.

BACKGROUND OF THE INVENTION

1. Field of the Invention

The present invention relates to a system and a method capable of emulating existing tape drive systems with a virtual tape management system having tape creation and management options.

2. Prior Art

It is necessary to store and backup data for many mainframe computer installations primarily for the purpose of safekeeping critical information to be used in the event of an unexpected loss of the primary copy. The backups are often remotely stored offsite of the mainframe installation.

At one time, ten inch, round reel tape drives were utilized on mainframe installations. The well known tape itself consists of a thin plastic base material with a coating of ferromagnetic ferric oxide powder. The round reel tapes were physically transported to an offsite location. Periodically, the tapes would be returned and then reused.

In the 1980's, cartridge tape units replaced the round reel tape drives. The tape cartridge system had fewer moving parts and was less prone to failure. Additionally, the tape cartridge system occupies a smaller floor footprint and consumed less power than the round reel drives. Additionally, the media itself was improved over time. Denser recording techniques allowed the cartridges to be smaller, yet hold the same amount of data. To improve cataloging and indexing functions, and facilitate data accessibility, typically one data set is placed on one tape volume. Some tape data sets span multiple volumes while others occupy less than a single volume. This can result in a significant waste of tape as most data sets occupy only a small portion of the media and the rest of the volume remains unused. Estimates are that industry norms are for tape cartridges to be less than 50% utilized. With a cartridge tape system, the same procedures for physically pulling certain cartridges and moving them to an offsite location would be performed.

More recently, virtual tape servers have been introduced which place a controller between a mainframe and the cartridge tape devices and attach a disk cache area from and to which data can be read and written. The controller handles the migration of data between the disk cache and the tape media in an optimal space and time fashion. The date is actually being read from and to disks. The disks are typically faster than tape devices.

Information regarding tape volumes is stored in a tape catalog, maintained by a tape management system running on the host mainframe. The tape management system associates a particular tape using its primary identifier, the tape's volume serial number, with the data sets stored onto it along with its retention, or expiration date. In order to manage the re-use of tapes, the retention date indicates when the data on a tape is no longer required and at such point in time, the tape may have its data overwritten or "scratched" out. Scratch tape is a common mainframe term for a tape available to be written upon, regardless of its prior contents if any.

A scratch list is a report that is generally prepared on a daily basis that includes all of the volume serial numbers whose retention date expired on that day. A human typically refers to this report while walking through a tape library, pulling those tapes on the report so that they may be placed into the scratch pool for reuse. The tape management system imposes a safe guard against non-expired tapes being mounted in place of a scratch tape by comparing the tape's volume serial number against its catalog expiration date. This volume serial number, in addition to being hand written onto the exterior of the tape, is on the beginning of the tape prior to the start of data set information in a section known as a "header". When a scratch tape is mounted for writing, the tape management system inspects the tape catalog to verify that the tape is truly a scratch. If not, then it is rejected and a different scratch tape requested.

A vault is a report prepared at some particular time interval that includes all of the volume serial numbers that are to be removed from the tape library and physically taken offsite. Mainframe data centers have the need to move or copy data to off site locations, primarily for the purpose of safe keeping critical information to be used in the event of an unexpected loss of the primary copy of that information. This typically involves physical transportation of the mainframe tapes, an error prone process in that sometimes all the required tapes are not sent or sometimes a tape sent in error that is later required to be retrieved in order to complete the processing of a mainframe job. Further, the data on these tapes is typically unencrypted and therefore vulnerable to anyone being able to read it.

The tape management system is primarily used to cross-reference the location of a desired data set to a tape volume serial number. It is secondarily used to manage scratch lists and vault lists.

The present invention is supported via an encrypted communications protocol interfacing with, and relying upon, the teachings, practices and claims disclosed in U.S. Pat. No. 6,499,108 (hereinafter synonymously referred to as "Secure Agent®" or "SA"), which is incorporated herein by reference.

Secure Agent Overview

The following overview is provided to facilitate a comprehensive understanding of the teachings of the instant invention. Secure Agent™ utilizes a secure login sequence wherein a client connects to a Secure Agent server using a key known to both systems and a client connects and presents the server with user identification (as used herein the term "client" refers synonymously to a remote user or component establishing, and communicating with the instant invention through Secure Agent allocation and encryption processes as taught in the above noted applications). If recognized, the Secure Agent server initiates a protocol whereby the client's identification is verified and subsequent communication is conducted within a secured (encrypted) construct. For purposes of this overview, the term "server" should be considered a hardware configuration represented as a central processing unit wherein Secure Agent, a Host DLL and driver reside, and are executed. The term "DLL" as used herein refers to a Secure Agent host dynamically linked library (a.k.a. Host DLL). The term "DLL" or "dynamically linked library" is used in a manner consistent with that known to those skilled in the art. Specifically, the term "DLL" refers to a library of executable functions or data that can be used by a Windows™ or LINUX application. As such, the instant invention provides for one or more particular functions and program access to such functions by creating a static or dynamic link to the DLL of reference, with "static links" remaining constant during program execution and "dynamic links" created by the program as needed.

The Secure Agent server presents a variable unit of data, such as the time of day, to the client as a challenge. The client must then encrypt that data and supply it back to the server. If the server is able to decrypt the data using the stored client's key so that the result matches the original unencrypted challenge data, the user is considered authenticated and the connection continue. The key is never passed between the two systems and is therefore never at risk of exposure.

The initial variable unit of data seeds the transmission of subsequent data so that the traffic for each client server session is unique. Further, each byte of data transmitted is influenced by the values of previously sent data. Therefore, the connection is secure across any communication passageway including public networks such as, but not limited to, the Internet. The distance between the client and server is not of consequence but is typically a remote connection. For accountability purposes, the actions of a client may be recorded (logged) to a non-volatile storage at almost any detail level desired.

The access rights of each client (what the client is able to accomplish during a session) is governed by data stored on the Secure Agent server to which the client is associated. As an example, such rights might encompass the ability to administer and utilize the services of the server system, which would, in turn, include capabilities such as adding new clients or components, changing a user's rights, transferring new code to the server, using a feature (or service) of the server and more.

Consequently, Secure Agent allows for the transmission of new code to the server and for that code to be implemented upon demand by a client. Such dynamic, real-time implementation in turn, allows for the behavior of the server to be modified. It is to this behavior modification the instant invention addresses its teachings, and thereby advances the contemporary art.

As will be readily appreciated by those skilled in the art, though the instant invention utilizes encryption/decryption and code recognition technology associated with Secure Agent, alternative technologies may be employed in support of the instant invention without departing from the disclosure, teachings and claims presented herein.

BRIEF SUMMARY OF THE INVENTION

In the present invention, when one component desires to communicate to another component it assumes the role of a client when connecting to the other component's server. The roles, however, of client and server are largely of consequence only in how it relates to validating the access of one component to another and the fact that the 'client' component is requesting a service offered by the 'server' component.

The virtual tape catalog component to be described is a database repository of tape related information regarding each virtual tape used by the tape emulator. It is used to manage the disposition of tapes and is therefore much like a mainframe's internal tape catalog. The virtual tape catalog is crucial to the operation of the system and is therefore replicated to one or more remote locations. Along with the primary data element used to identify a specific virtual tape, the volume serial number, it indicates the information necessary to manage it such as:

Expiration date.
Scratch indicator.
Indicator that it should always be copied to remote data storage.
Indicator that it ready to be copied to remote data storage.
The remote data storage target to which it should be copied.
Indicator that the source tape file should be deleted after being copied to remote data storage (a move operation).
Indicator that it should always be copied to an archiver.
Indicator that it is ready to be copied to an archiver.
The archiver target to which it should be copied.
Indicator that the source tape file should be deleted after being copied to an archiver (a move operation).
The host processor dataset names that it contains.
The size of the tape file.
The date and time when it was created.
The date and time when it was last accessed.
The current locations of the tape file.
The date and time that it was transmitted to its current locations.
An indicator that it is currently in use.
The security groups to which it belongs.
Indicator that the tape file should be automatically retrieved upon a mount request if it happens to have been moved off the tape emulator component.
Indicates that it should be recovered to the tape emulator component.
Indicates it should be encrypted when created.
Encrypted indicator.

In addition to information specific to each tape, additional information is stored within the virtual tape catalog such as global configuration information and rules that govern the disposition of tapes. These include:

The central key phrase (password) used to encrypt the virtual tape images.
Certain dataset name patterns that, when encountered during the creation of a tape, cause a tape to be reassigned into specific security groups.
Periods of time that, when compared against when a tape is to be expired during the creation of a tape, cause a tape to be copied to remote data storage.
Periods of time that, when compared against when a tape is to be expired during the creation of a tape, cause a tape to be copied to an archiver.
Periods of time that, if a tape goes unaccessed by the host processor, that it will be moved to remote data storage.
Periods of time that, if a tape goes unaccessed by the host processor, that it will be moved to the archiver.

The invention's host information component provides tape catalog and tape mount information from the host processor by way of one of the tape emulator component's devices. The specific device may be any device type best suited for the facilities available to the host information component. Non-limiting examples include 3480, through special commands or sequences; 3286 printer emulation; or 3270 display emulation. Based on a unique communication sequence initiated by the host information component, this particular emulated device is able to recognize that it services the 'control path' and reacts accordingly.

The 'control path' between the host information component and the remainder of the invention is used to supply all information required from the host such as tapes to be scratched, tapes to be transmitted to vault, tape mount requests and tape retrieval (or recall) requests. The information relating to tape scratches, tape vaulting and tape retrieval is collected periodically by the host information component from the host processor's tape catalog. The information relating to tape mount requests is collected as they occur, either by intercepting an operator message or by otherwise hooking into a host processor's tape mount user exit, a method by which a utility may gain useful information. For a tape to be scratched, vaulted or recalled, the device correspondingly updates the virtual tape catalog. For a tape to be mounted, the device relays the mount request to the emulated tape drive indicated in the request, parsing the request as necessary per the host processor's tape mount request message format. If, for whatever reason, the tape mount cannot be satisfied, a message is sent up through the control path to the host information component in order that an operator message may be issued indicating the reason for being unable to service the request.

Additionally, status information maintained on behalf of the emulated tape device is updated to reflect the current status so that an administrator might be able to review it.

Consequently, it is a principal object of the instant invention to provide a system and method for a virtual tape system which connects to mainframe hosts which will emulate multiple types of tape drive systems.

Another object of the present invention is to copy tapes to a remote data storage component in order to address the requirement for offsite backup of critical host processor data.

Another object of the invention is to interface with the host processor in such a manner as to receive from it information necessary both to properly update a virtual tape catalog, so that it corresponds with the host processor's catalog, and to satisfy tape mount requests.

Yet another object of the instant invention is to insure that all data transferred external of the emulated virtual tape system controller is encrypted in accordance with the teachings of the above noted patents.

Another object of the instant invention is to provide support for multiple device types which may be simultaneously supported and operated.

Another object of the invention is to utilize RAID technology for disk storage reliability wherever virtual tape images or virtual tape catalog is located.

RAID is short for Redundant Array of Independent (or Inexpensive) Disks, a category of disk drives that employ two or more drives in combination for fault tolerance and performance. RAID disk drives are used frequently on servers.

There are number of different RAID levels:

Level 0—Striped Disk Array without Fault Tolerance: Provides data striping (spreading out blocks of each file across multiple disk drives) but no redundancy. This improves performance but does not deliver fault tolerance. If one drive fails then all data in the array is lost.

Level 1—Mirroring and Duplexing: Provides disk mirroring. Level 1 provides twice the read transaction rate of single disks and the same write transaction rate as single disks.

Level 2—Error-Correcting Coding: Not a typical implementation and rarely used, Level 2 stripes data at the bit level rather than the block level.

Level 3—Bit-Interleaved Parity: Provides byte-level striping with a dedicated parity disk. Level 3, which cannot service simultaneous multiple requests, also is rarely used.

Level 4—Dedicated Parity Drive: A commonly used implementation of RAID, Level 4 provides block-level striping (like Level 0) with a parity disk. If a data disk fails, the parity data is used to create a replacement disk. A disadvantage to Level 4 is that the parity disk can create write bottlenecks.

Level 5—Block Interleaved Distributed Parity: Provides data striping at the byte level and also stripe error correction information. This results in excellent performance and good fault tolerance. Level 5 is one of the most popular implementations of RAID.

Level 6—Independent Data Disks with Double Parity: Provides block-level striping with parity data distributed across all disks.

Level 7: A trademark of Storage Computer Corporation that adds caching to Levels 3 or 4.

Level 0+1—A Mirror of Stripes: Not one of the original RAID levels, two RAID 0 stripes are created, and a RAID 1 mirror is created over them. Used for both replicating and sharing data among disks.

Level 10—A Stripe of Mirrors: Not one of the original RAID levels, multiple RAID 1 mirrors are created, and a RAID 0 stripe is created over these.

Writing to two different locations provides for great data integrity above and beyond that offered by a single RAID. If, when utilizing the two RAIDs a catastrophe occurs with one then the other remains unaffected. The host mainframe being serviced remains unaware of any problem and its data reads and writes complete successfully. Accordingly, it is an object of the present invention that during host mainframe service the tape emulation data is accessed from two locations providing the system the ability to withstand a failure of either single location.

Accordingly, it is an object of the present invention by simultaneously utilizing two independent RAIDs the data throughput remains identical to that when using a single virtual tape image location. The writes to the two RAIDs occur in parallel and complete at the same time. If, for example, two files were written to the same disk they would contend with one another for service by the drive. Duplicating files to different locations and writing them simultaneously improves data throughput over attempting data redundancy to different portions of a single drive assembly.

By frequently ensuring the integrity of all tape images and correcting anything found to be incorrect, such as incomplete or corrupted files, a self-healing facility is introduced ensuring the integrity of our data. Date integrity is ensured through inspection, comparison, and automatic data recovery from the system's redundant sources.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference would be had to the accompanying drawings, depictions and descriptive matter in which there is illustrated preferred embodiments and results of the invention.

DETAILED DESCRIPTION OF THE PREFERRED EMBODIMENTS

While making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

While the invention has been described with a certain degree of particularity, it is clear that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 1:
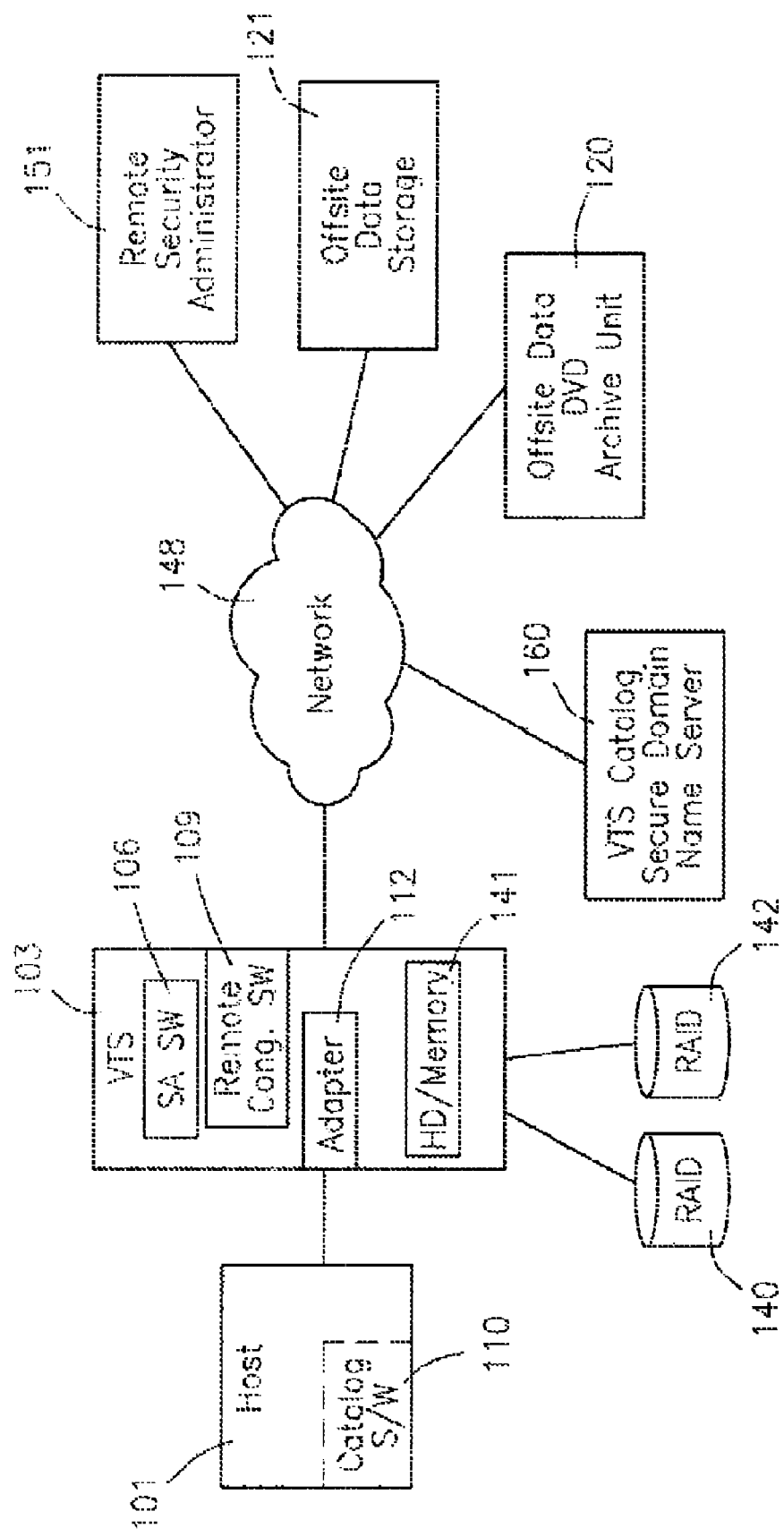
FIG. 1 is a system schematic providing a conceptual overview of primary hardware and software components of the instant invention as practiced in its preferred embodiment.

FIG. 1 illustrates a simplified schematic diagram of the components of the present invention. A mainframe host computer 101 may be executing various operating systems such as MVS, VM, VSE, LINUX and UNIX. The mainframe host computer 101 may also include a tape catalog 110.

The present system includes a virtual tape system ("VTS") 103 which has Secure Agent® software 106 executing under its control program. A VTS server 103 also has operating under control of its control program remote configuration software 109. Also embodied within the VTS server 103 is a hardware adaptor card 112. The adaptor card 112 is in turn communicably attached to one or more host processors, such as host processor 101. As used herein, the term "adaptor" refers synonymously to those hardware configurations such as, but not limited to, "adaptor cards" which allow for connectability between two or more central processing units and the transference of data associated therewith. Illustrative non-limiting examples of such adaptors as used herein would include various ESCON adaptors, parallel channel adaptors, FICON adaptors and SCSI adaptors.

The VTS server 103 also includes a hard drive or hard drives with a memory or memories 141.

Conceptually, the invention's tape emulator component 103 consists of lower level and higher level layers. The lower layer may be a device driver communicating directly with one or more hardware adaptors attached to one or more computer systems, such as, but not limited to, mainframe computers (a.k.a. host processors). Illustrative non-limiting examples of such adaptors as used herein would include various ESCON adaptors, parallel channel adaptors, FICON adaptors, and SCSI adaptors. From the host processor's perspective, the tape drive emulator's virtual drives are indistinguishable from real tape drives as it pertains to normal operations.

The driver controls the hardware in a manner prescribed by its design, causing it to interact with the other host processor computer systems to which it is connected as if it were one or more device types (emulation). The driver acts as a conduit to the higher layer that governs the overall behavior of the emulated devices.

The higher layer primarily supplies the driver with new data to provide through the emulated devices to the other computers to which it is connected and accepts data arriving to the emulated devices carried up by the driver. The higher layer manages the information repository against which the driver operates. Using the example of a 3480 tape drive, the higher layer's information repository represents a virtual tape. Mainframe reads and writes are serviced using the contents of this virtual tape. The virtual tape files reside on RAID disk drives, encrypted using a central key phrase specified by the security administrator, as will be explained in detail. Therefore, the data stored onto the RAID devices is not useful when accessed outside of the present process, thereby increasing data security.

Each instance of an emulated device is associated with unique security group information which, when compared against the security group contained within the virtual tape catalog for each tape, controls which tapes may be loaded on it. This security group comparison is performed upon receiving a tape mount request from the host information component. Additionally, if the tape requested is for a 'scratch', then such a tape is requested from the virtual tapa catalog.

If a tape is not locally available, because it has been moved off of the tape emulator component by either the remote data storage or archiver components, then the mount may not be immediately satisfied. In this event a notification is made to the host information component. If the virtual tape catalog indicates that it should be automatically recalled then it will be updated to indicate such a recall should be performed; a priority event for the remote data storage component. In such an event the emulated device periodically inspects the virtual tape catalog to determine whether the tape has been recalled, continuing once it has.

Once an appropriate tape is locally available, exclusive access is ensured by comparing then setting its in use indicator within the virtual tape catalog. The virtual tape is then used as the emulated device's data repository. Upon being written, the virtual tape catalog is updated with the fact that it has been updated. As the contents of a virtual tape are updated by the host processor, relevant information is updated in the virtual tape catalog.

By default a virtual tape has been freshly written or created will receive the security groups of the device that created it. However, the administrative tool may be used to indicate certain dataset name characteristics that may be used to redirect the virtual tape into different security groups. Additionally, any other administration policies, such as might be applied based on the dataset names or expiration date, are applied.

When the tape is dismounted, the last access date is updated in the catalog. It is then marked as no longer being in use within the virtual tape catalog, allowing the remote data storage and archiver components the ability to act upon it as necessary.

The invention's remote data storage component is primarily responsible for collecting a virtual tape image from a tape emulator. The remote data storage component, when idle, periodically requests tape movement criteria from the virtual tape catalog, prioritizing 'recall' requests for virtual tapes to be recovered from the remote data storage to the tape emulator.

Like each emulated tape device and each virtual tape, the remote data storage component is assigned to one or more security groups controlling which tapes it is able to transfer from the tape emulator. If a candidate tape doesn't have a matching security group then it is not considered for transfer and ignored.

Prior to a transfer it ensures dedicated access by comparing then setting the virtual tape's in use indicator within the virtual tape catalog. The virtual tape is then copied as per the virtual tape catalog. After the tape has been copied the virtual tape catalog is updated to reflect the virtual tape's locations and time it was copied. Additionally, if the operation was not a recall and was a move rather than a copy, it is then deleted off of the tape emulator. Finally, the virtual tape's in use indicator is cleared in the virtual tape catalog.

The invention's archiver component is conceptually similar to the remote data storage component, except its target media is permanent write-once storage, such as a robotic DVD burner or SCSI attached tape drives, rather than disk. The archiver, when idle, periodically requests tape movement criteria from the virtual tape catalog, prioritizing 'recall' requests for virtual tapes to be recovered from the archiver to the tape emulator.

Like each emulated tape device and each virtual tape, the archiver component is assigned to one or more security groups controlling which tapes it is able to transfer from the tape emulator or data storage components. If a candidate tape doesn't have a matching security group then it is not considered for transfer and ignored. In the case of a recall the archiver will scan a specific storage unit, such as a read-only DVD drive, to identify whether or not a volume to be recalled has been manually inserted.

Whenever removable media has been inserted into the archiver's reader unit, information relating to it, such as the volume serial number, will be provided for display by the administrative tool component. If a volume of interest is not inserted it will repeat checking the storage unit on a periodic basis. Recalls involve a copy from permanent storage to the tape emulator while non-recalls involve copies from a tape emulator or data storage component to a permanent, write-once storage unit.

Prior to a transfer it ensures dedicated access by comparing then setting the virtual tape's in use indicator within the virtual tape catalog. The virtual tape is then copied as per the virtual tape catalog. After the tape has been copied the virtual tape catalog is updated to reflect the virtual tape's locations and time it was copied. Additionally, if the operation was not a recall and was a move rather than a copy, it is then deleted off of the tape emulator or remote data storage. Finally, the virtual tape's in use indicator is cleared in the virtual tape catalog.

An additional task performed by the archiver is, upon administrator demand, for the information regarding a virtual tape image to be constructed from removable media that has been inserted into the archiver's reader unit. Upon this event, the archiver will inspect the removable media for the volume serial number, ensure dedicated access by comparing then setting the virtual tape's in use indicator within the virtual tape catalog, creating the virtual tape catalog entry if an entry for the tape didn't previously exist. It will then update the virtual tape catalog with the information supporting the removable media's virtual tape image contents then clear the virtual tape's in use indicator in the virtual tape catalog.

The administrative tool component provides a human administrator the ability to manage the behavior of the virtual tape system using Secure Agent® administrative functions as taught by the afore noted pending patent applications and patents.

Also shown in FIG. 1 is a Security Administrator client central processing unit 151 interactively communicating with the Secure Agent® software 106 operating within the VTS server 103. As will be discussed in further detail, the Security Administrator 151 utilizes Secure Agent software 106 to administer and maintain user/resource profiles 157 and further communicates with information conveyed to said Secure Agent software 106 via the software processes associated with the remote configuration software 109. The Security Administrator 151 controls the configuration of one or more of the VTS devices and also controls access to remote off site backup devices to be described.

The present invention also includes one or more remote data storage client devices, such as remote data client storage 121 with disk storage and remote data client storage 124 with DVD archive unit, each of which is connected to the virtual tape system 103 through a network or networks, such as the Internet.

The following discussion in association with FIG. 1 generally discusses the interrelationships of hardware and software processing components of the instant invention. In FIG. 1, a remote Security Administrator 151 defines via Secure Agent software 106, user and resource profiles. Such profiles are stored in a non-volatile storage medium, such as but not limited to, a disk drive. User resource records are those records which typically define security group or groups, and access control variables associated with the user. The user resource record/profile defines those resources that the user may utilize and the bounds of such utilization. The Security Administrator 151 may also define resource profiles. Such resources profiles define the device type and grouping of emulated input/output devices as well as central processing unit designations associated with each emulated device type and/or grouping. When attempting to establish a session between a VTS 103 and any one of the remote offsite data storage client devices via a communications network 148, the remote data storage device communicates first with Secure Agent software 106 operating within the VTS server 103 of the instant invention 109. The processing subcomponents of the instant invention further include Adaptor Configuration Load, Client Communication, Client Termination, Administration, Server Initialization and Server Termination subprocesses.

The Virtual Tape System (VTS) Catalog is a repository of tape related information maintained on a secure name server 160 that is used by the VTS 103 to manage the disposition of its tapes and is much like the mainframe's tape catalog. In fact, information from the mainframe tape catalog is periodically provided to the VTS so that it might update the VTS Catalog. Specifically, each time a tape image is created, information on that tape image is placed in the VTS catalog. Each time a tape image is moved to archive, that information is placed in the VTS catalog.

The VTS includes a component that is installed and executes upon, or 'inboard', the mainframe computer. The purpose of this inboard component is to transmit information to the VTS, accomplished by it allocating one of the VTS's emulated devices and communicating through it in order to transfer such things as the scratch list and vault list, both retrieved from the mainframe's tape catalog.

Additionally, tape mount messages that indicate the tape volume serial number to be mounted upon a particular drive are also transferred through this interface. The interface may be accomplished through either of two means. First, it may be implemented by way of unique commands to a VTS emulated tape drive that are otherwise unused during the normal course of tape operations. When these unique commands are received they are inspected for validity and its contents retrieved. Second, it may be implemented by way of the normal transfer of data to another emulated device type such as a 3286 printer or 3270 display. These latter approaches require that the normal device data streams be parsed as necessary in order to extract the desired information from them.

The receipt of the tape scratch list causes the VTS Catalog to be updated to reflect which tapes are now considered scratch candidates while the receipt of the vault list causes the VTS Catalog to be updated to reflect which tapes are to be transmitted to the offsite data storage component.

In addition to the information in the VTS Catalog that is modified by the inboard component, the transmission of tapes from the emulated device unit to the offsite data storage component, and vice versa, is reflected in the same VTS Catalog. Therefore, all of the information regarding a specific tape is retained in the VTS Catalog.

Finally, the information within the VTS Catalog may be controlled by a user that connects into the VTS as an administrator. As an example, the administrator may perform such tasks as instructing that a particular tape image should be recovered from the offsite data storage component to the emulated device unit for a later anticipated mount.

The Security Administrator central processing unit 151 has system software which is communicably attached through the network to the virtual tape system central processing unit and is also connected through the network to a remote data storage 121. The Security Administrator 151 may also be attached to a remote archiver component with such devices as DVD or SCSI tapes. The archive device may take various forms such as a mass storage unit or other similarly intended structures designed to accommodate the storage and retrieval of digitized data. The present invention allows for one or more backup archives data storage devices.

A VTS catalog may be maintained at a secure name server or secure domain name server 160.

The Security Administrator 151 can define a volume or set of volumes to be archived which are to be stored in the data storage devices 121 or 124. To provide parameters for the backup, the Security Administrator 151 specifies those volumes and directories and/or files to be backed up, the frequency and time of day at which the specified files are to be backed up, and encryption key for the backup data set, and the identification of the particular storage CPU desiring to be used.

Once the VTS server has connected with the remote data storage such as device 121, software operating within the VTS encrypts data to be transmitted to the remote data storage according to a generated encryption key.

From the mainframe host perspective, the tape drive emulator's virtual drives are indistinguishable from real tape drives as it pertains to normal operations. Disk files are created on RAID drives to represent tapes. These virtual tape images are encrypted using a central key phrase specified by the security administrator. Therefore, the data stored onto the RAID devices is not useful when accessed outside of the present process, increasing data security. The tape drive emulator is usually connected via a network to a remote data storage component for the purpose of accomplishing the requirements of offsite data storage. The actual location of this offsite storage component doesn't matter as standard network connectivity is employed, under the control of Secure Agent, for communication. The offsite storage component, like the tape drive emulator, utilizes RAID storage.

Figure 2:
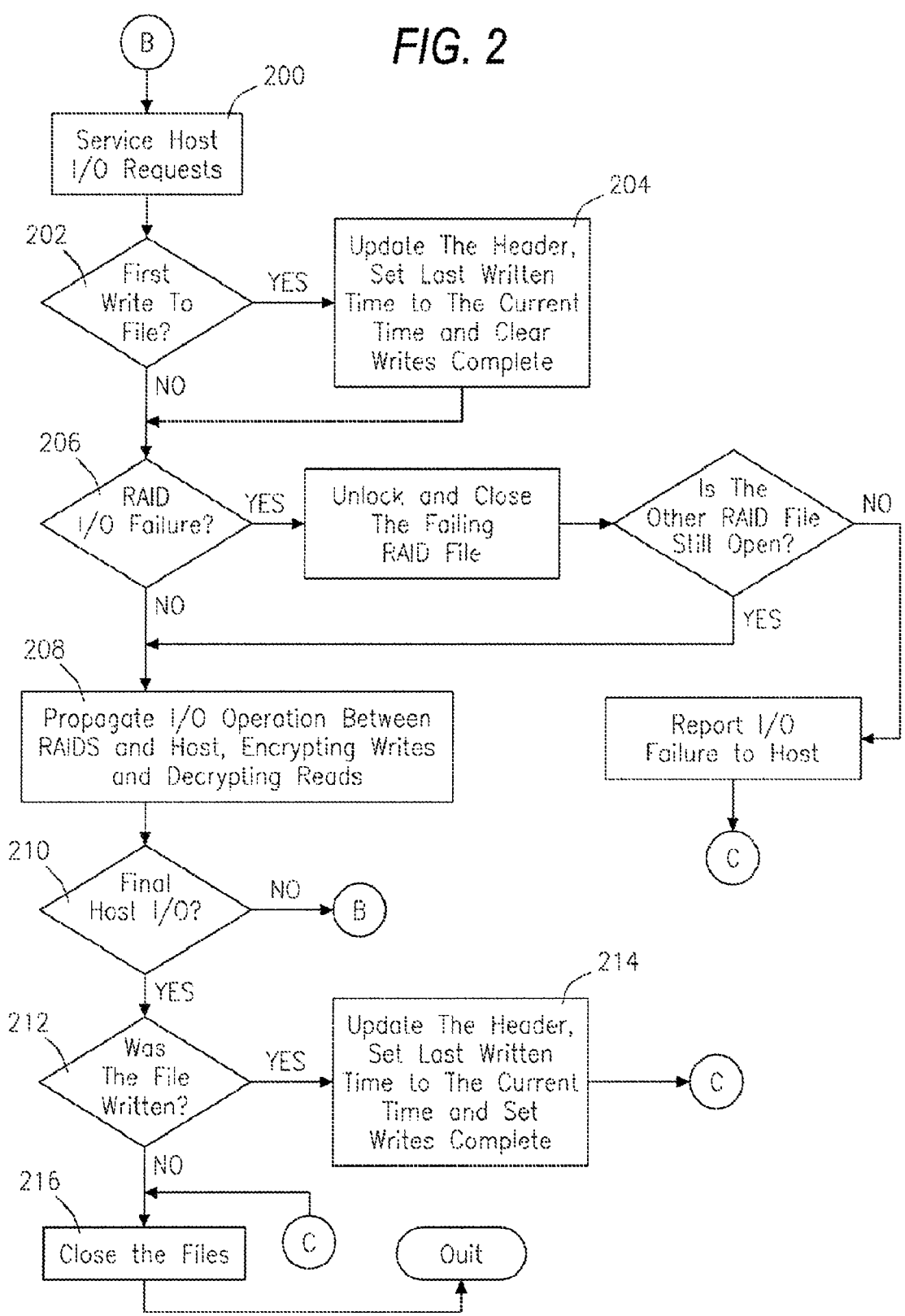
FIG. 2 is a logic flow diagram illustrating processing steps associated with a host reading a file or files or a host writing to a file or files in accordance with the present invention.

FIG. 2 illustrates a flow chart sequence of an example of a host 101 reading a file or files or a host writing to a file or files. The process will be initiated by a request from a host 101 as shown at box 200.

The tape emulation unit is equipped with two external RAIDs 140 and 142 located far enough apart so that any power or environmental problem affecting one should not affect the other. The locations of the RAIDs 140 and 142 are indicated by the VTS catalog 160. An administrator, such as security administrator 151, may configure the locations into the catalog 160 which are relayed to the VTS 103 each time the catalog connects to it. In fact, there are three independent connections that the catalog makes to the VTS, one to each of three tasks: the emulator, the mover and the checker. The catalog 160 propagates the RAID locations to each of those tasks.

1. An administrator may assign new tape image locations (the paths of the two RAIDs) into the catalog.
2. Whenever the catalog connects to a VTS task (emulator, mover or checker), it provides it that assignment.

When the emulation task is requested by a host computer to mount a virtual tape volume, the following is performed:
1. The volume serial number of the desired volume is encrypted to formulate an unreadable file name which is used to select the appropriate files to be accessed. The clear text volume serial number (e.g. VOL123) is not used as the file name.
2. Each of the two RAID disks is inspected to determine whether the desired file is present.
    If both are located they are each selected to be opened.
    If only one is located then it is selected to be opened alone.
    If neither is located then new files are created on both disks. At this time the file headers are created and populated with information such as the header version, the code level of the unit creating the file and the file's location. The header's "Last Written Time" is stamped with the current time and the "Writes Complete" indicator is set. The file is populated to represent a blank tape image, with any necessary data or headers necessary for the host system to accept it as being a properly formatted volume ready for use. All data within the file is encrypted.
3. The files are opened and the entire file is locked using standard file system level locking facilities. If a file cannot be opened or locked due to being used by another task (such as the checker) then both files are unlocked and closed. Processing ceases and is retried after a ten second delay.
4. When both files are opened and locked then their headers are read, decrypted and compared.
    If one file's "Last Written Time" is older than the other then it is unlocked, closed and discarded, such discarding usually involving simply renaming it for potential data recovery purposes.
    If one file's "Writes Complete" indicator is not set while the other one is then it is unlocked, closed and discarded.
5. The host computer reads are serviced by reading from one of the two files while moving the other's file pointer to keep it in sync at the proper offset to be ready for use when necessary. The selection process as to which file is used during reads is based on which of the two disks is servicing the least number of tape image reads in order to provide a balance of I/O between the two disks.
   6. Host computer writes are sent to each of the two files. When the first write occurs it causes the file headers to be updated such that the "Last Written Time" is set to the current time and the "Writes Complete" indicator becomes unset.
   7. If a file error occurs then it is unlocked and closed without any update to its header.
      If a file is open on the other disk then it is used as the sole source to service the host's I/O operations. The host computer is not made aware of any problem.
      If no other file is open then an I/O error is promoted to the host computer.
   8. After the host computer has completed use of the virtual tape, if any writes had been performed then the headers are updated such that the "Last Written Time" is set to the current time and the "Writes Complete" indicator becomes set. The files are unlocked and closed.

Returning to a consideration of FIG. 2, after a request from a host shown at box 200, an inquiry will be made whether the request is a first write to a file as shown at diamond 202. If the answer is yes, the header will be updated as shown at box 204.

If the answer is no, an inquiry will be made to see whether there is a RAID input/output failure as shown at diamond 206. If the answer is no, the system will proceed to propagate the input/output operation between RAIDs and the host as shown at box 208. Once the final host input/output is performed as shown at diamond 210, an inquiry will be made to determine whether the file was written as shown at diamond 212. If the answer is yes, the header will be updated as shown at box 214. If the answer is no, the files will be closed as shown at box 216.

Figure 3B:
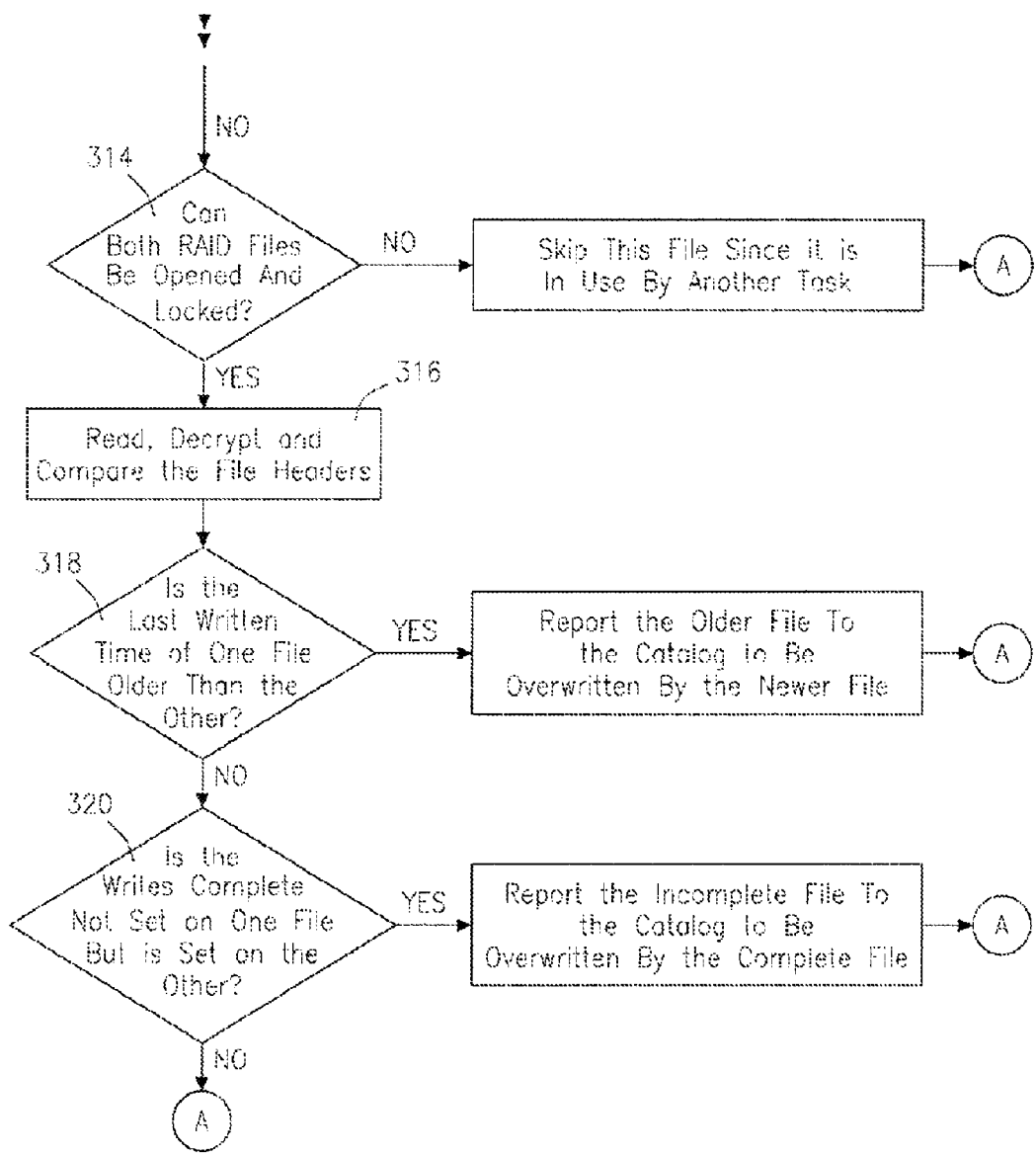
FIG. 3 is a logic flow diagram illustrating operation of a data integrity component of the present invention.

FIG. 3 is a flow chart of operation of a data inspector component which is employed to frequently inspect the integrity of the tape image files and periodically performs the following:
   1. A query is issued to the catalog as to which tape image files it should be expected to encounter.
   2. Enumerates the tape image files on both locations.
   3. The files for each tape image having files present on both disks are opened and the entire files locked using standard file system level locking facilities.
   4. If a file cannot be opened or locked due to it being used by another task (such as the emulator) then both files are unlocked and closed. Processing of this tape image is ignored until the next pass when processing is reattempted.
   5. When both files are opened and locked then their headers are read, decrypted and compared.
      If one file's "Last Written Time" is older than the other then it is unlocked, closed and discarded, such discarding usually involving simply renaming it for potential data recovery purposes.
      If one file's "Writes Complete" indicator is not set while the other one is then it is unlocked, closed and discarded.
   6. For any tape images present on one disk but not the other, such as might occur after a file has been discarded, an attempt is made to open and lock the source file, create and lock a new file on the other disk, copy it then unlock and close them.

Returning to a consideration of FIG. 3, the data inspector or checker component begins processing upon expiration of a set time period as set forth in box 300. Thereafter, the catalog will be queried to determine which files are expected to exist on the RAID assemblies 140 and 142 as shown in box 302. As shown in box 304, the files which are present on the RAID assemblies are enumerated. Thereafter, each file will be processed as shown at box 306.

As shown at diamond 308, once all processing has been completed, the operation will stop or quit. If the operation is not fully completed, it will be queried whether an expected file is missing from both RAIDs as shown at diamond 310. As shown at diamond 312, if a file is present on only one of two RAIDs, then the missing file will be reported for recovery. If the answer is no, it will be determined whether both RAID files can be opened and locked as shown at diamond 314. If the answer is yes, the file headers will be read, decrypted and compared as shown at box 316. If the last written time of one file is older than the other, as shown at diamond 318, then the older file will be reported to be overwritten by the newer file.

If the write complete is not said on one file but is said on the other file as shown at diamond 320, then the incomplete file will be reported to the catalog to be overwritten.

The present invention provides additional creation and management options with speed and integrity improvements along with self-healing facilities not heretofore known.

It will be apparent to those skilled in the art that various modifications and variations can be made in the construction, configuration, and/or operation of the present invention without departing from the scope or spirit of the invention. Thus, it is intended that the present invention cover the modifications and variations of the invention provided they come within the scope of the appended claims and their equivalents.

What is claimed is:

1. A system to facilitate virtual tape management of data and remote backup, archival, and retrieval of said data via communication of encrypted data comprising:
   a virtual tape management central processing unit;
   at least one host processor central processing unit communicably attached to said virtual tape management central processing unit wherein said host includes a catalog storing tape related information;
   a pair of independent RAID assemblies communicably attached to said virtual tape management central processing unit;
   first software for validating authorized remote access to said RAID assemblies and for encryption of data, said first software executing from within said virtual tape management central processing unit;
   second software for facilitating remote configuration and utilization of said virtual tape management central processing unit; and
   third software for tape image file processing including inspecting each said RAID assembly to determine if a file is present on one or both said RAID assemblies, opening said file, reading tape related information thereon, and reading from or writing to said RAID assemblies.

2. The system to facilitate virtual tape management of data in accordance with claim 1 including a virtual tape system catalog storing tape related information, said catalog being updated on creation of a tape image, on movement of a tape image, or on instruction from a security administrator central processing unit.

3. The system to facilitate virtual tape management of data in accordance with claim 1 wherein said first software is receptive to and processes data communicated from said second software.

4. The system to facilitate virtual tape management of data in accordance with claim 1 wherein said second software is receptive to and processes data communicated from said first software.

5. The system to facilitate virtual tape management in accordance with claim 1 further comprising a communication means wherein data exchanged between said RAID assemblies and said virtual tape management central processing unit is encrypted prior to transmission and decrypted subsequent to transmission.

6. The system to facilitate virtual tape management in accordance with claim 2 further comprising a communication means wherein data exchanged between said security administrator central processing unit and said virtual tape management central processing unit is encrypted prior to transmission between said central processing units and decrypted subsequent to transmission between said central processing units.

7. A system to facilitate virtual tape management of data and remote backup, archival, and retrieval of said data via communication of encrypted data comprising:
   a virtual tape management central processing unit;
   a pair of remote independent RAID assemblies communicably attached to said virtual tape management central processing unit;
   first software for validating authorized remote access to said disk drives and for encryption of data, said first software executing from within said virtual tape management central processing unit;
   second software for facilitating remote configuration and utilization of said virtual tape management central processing unit;
   at least one host processor central processing unit communicably attached to said virtual tape management central processing unit wherein said host includes a catalog storing tape related information; and
   third software for data integrity for tape image files for said RAID assemblies which includes determining which files are expected to be on said RAID assemblies, enumerating tape image files on said RAID assemblies, opening said tape image files, reading said tape related information, and comparing the tape related information for data integrity.

8. A computer based method for facilitating utilization of a virtual tape management system for remote backup, archival and retrieval of data via communication of encrypted data comprising:
   (a) initializing and communicating with a virtual tape management central processing unit from a host;
   (b) establishing a connection between said virtual tape management central processing unit and a pair of remote disk drives;
   (c) validating authorized remote access to said disk drives via software executing from within said virtual tape management central processing unit;
   (d) managing a virtual tape system catalog containing tape related information on each virtual tape image including volume serial number;
   (e) inspecting each said disk drive for desired tape related information including volume serial number; and
   (f) determining if a file is present, opening said file, reading said tape related information thereon, and reading or writing to said disk arrays.

\* \* \* \* \*